United States Patent [19]

Koike et al.

[11] Patent Number: 4,494,215
[45] Date of Patent: Jan. 15, 1985

[54] DISK SYSTEM

[75] Inventors: Takashi Koike, Tanashi; Hajime Sugiura, Kawasaki, both of Japan

[73] Assignee: Fujitsu Limited, Kawasaki, Japan

[21] Appl. No.: 437,159

[22] Filed: Oct. 27, 1982

[30] Foreign Application Priority Data

Oct. 30, 1981 [JP] Japan .................................. 56-17389

[51] Int. Cl.³ ............................................ G06F 13/00
[52] U.S. Cl. .................................................. 364/900
[58] Field of Search ... 364/200 MS File, 900 MS File

[56] References Cited

U.S. PATENT DOCUMENTS 4,303,988 12/1981 Tsuboka et al. .................... 364/900

Primary Examiner—Raulfe B. Zache
Attorney, Agent, or Firm—Staas & Halsey

[57] ABSTRACT

A disk system comprising a plurality of disk units (1-0 to 1-7) divided into primary logical volumes (101 to 171) and secondary logical volumes (102 to 172) which are controlled by a plurality of disk controllers (4-AA to 4-BB). One of disk controllers sets an assign bit to cause one of the logical volumes to perform a stand-alone operation. This assign bit can be reset by another disk controller for another logical volume, which generates an unconditional reserve command. In this system, flip-flops (18, 19) for storing a stand-alone control signal, decoders (7-AA~7-BB) for an unconditional reserve command, interruption signal generating circuits (27, 28), a notification circuit (9), and the like are provided so that the issuance of an unconditional reserve command is notified to the corresponding disk controller.

6 Claims, 4 Drawing Figures

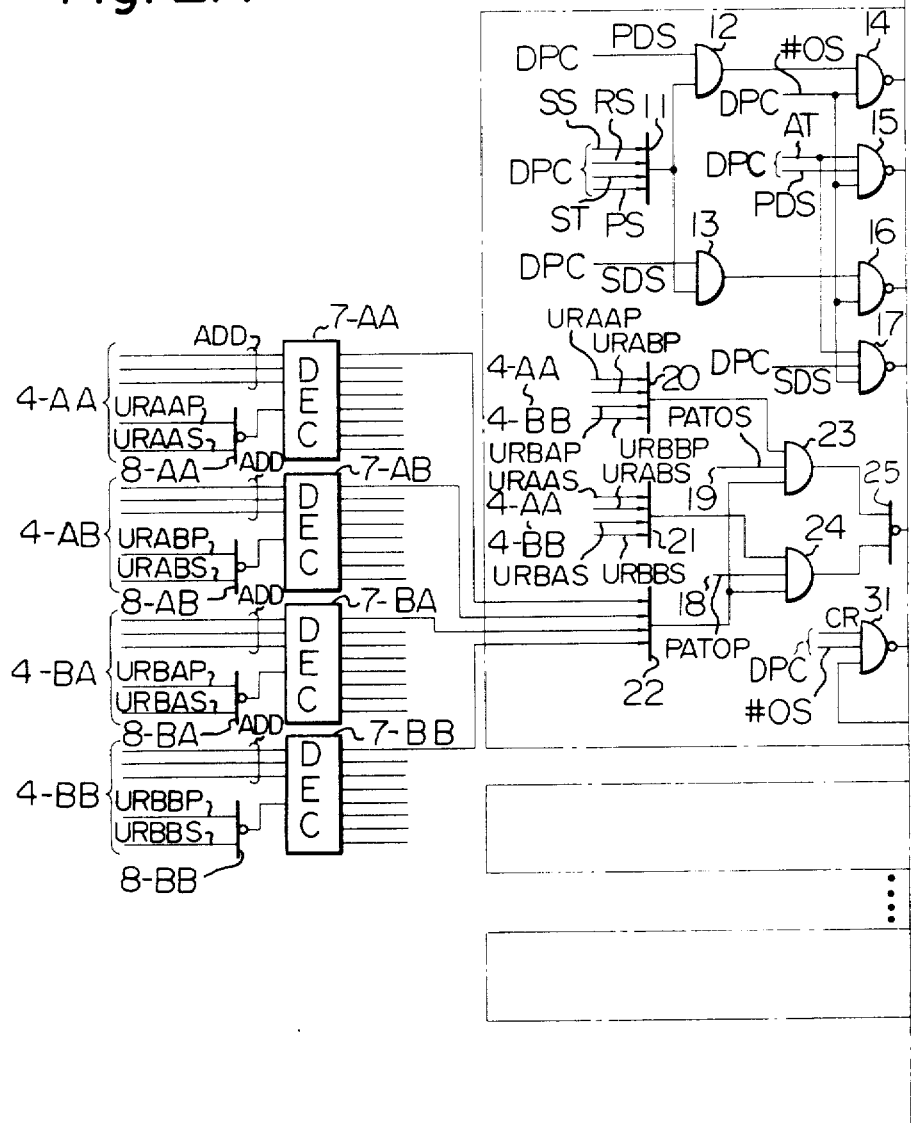

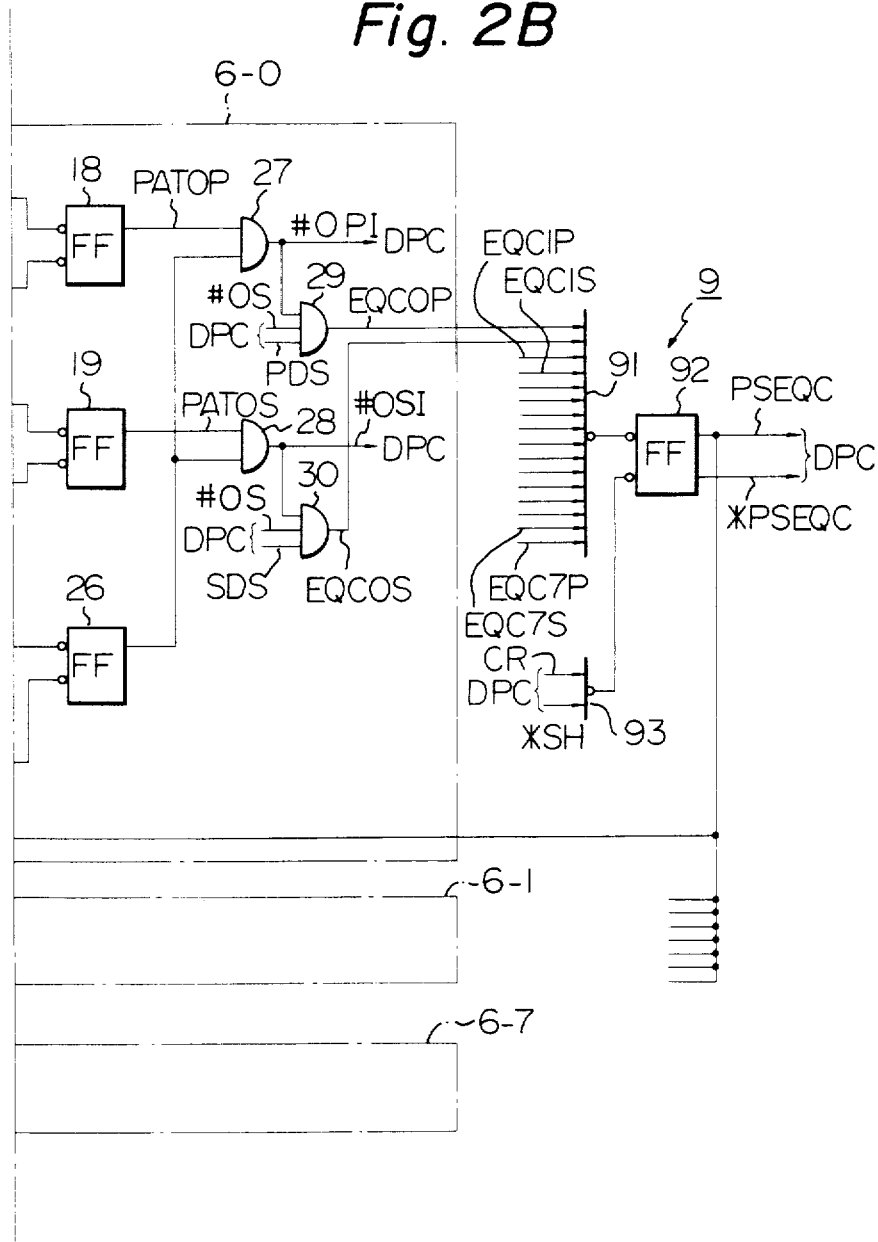

DISK SYSTEM

BACKGROUND OF THE INVENTION

1. Field of the Invention

The present invention relates to a file subsystem, more particularly, to a disk system comprising a plurality of disk units or disk pack units controlled by a plurality of disk controllers.

2. Description of the Prior Art

In a prior art disk system, a plurality of disk units are connected in series. Each of the disk units is divided into a primary logic volume and a secondary logic volume to which individual machine numbers are assigned. In addition, a double access path is provided in the series of disk units. Such disk units are controlled by a plurality of disk controllers.

As an interface between the disk units and the disk controllers, string switching mechanisms and disk control adapters are provided. The same number of string switching mechanisms as disk controllers, are usually provided. Two disk control adapters are usually provided. These are connected to the double access path for the series of disk units.

In the above-mentioned disk system, when a first disk controller performs a seek-control operation or other scanning-control operation upon a logical volume of one disk unit, the first disk controller sets an assign bit to indicate occupation of the logical volume. That is, the first disk controller causes the logical volume to perform a stand-alone operation. Accordingly, the first disk controller is free from the disk unit. In this state, when a second disk controller seeks to access another logical volume of the same disk unit, a "busy" signal is returned from the disk unit to the second disk controller, since such two logical volumes form one physical or real volume.

After the disk unit completes the scanning-control operation, the disk unit issues an interruption signal to the first disk controller which, in turn, performs the next operation.

Since each logical volume is commonly controlled by a plurality of disk controllers, any malfunction in the logical volume during a stand-alone operation blocks all other control operations for the disk unit including this logical volume by the other disk controlllers. To avoid this, when the second disk controller seeks to access one logical volume of a disk unit and a predetermined number of receives "busy" signals, the second disk controller makes a determination that a malfunction has occurred in the logic volume, and as a result, resets the assign bit by issuing an unconditional reserve command for the logical volume, thus also releasing the other logical volume under the stand-alone operation.

In the above-mentioned prior art, however, the second disk controller issues an unconditional reserve command to reset the assign bit every time it seeks to access one logical volume for a predetermined period and receives "busy" signals. In some cases, however, there is no actual malfunction. In some cases, as a result of the above operation, the first disk controller will thus be in a standby state awaiting an interruption signal from the other logical volume which will never be issued, thus creating a "device-end-pending" state. If this logical volume is a system volume which stores programs for an operating system, the system will go down.

SUMMARY OF THE INVENTION

It is an object of the present invention to provide a disk system in which no "device-end-pending" state is generated.

According to the present invention, after a first disk controller sets as assign bit to cause one logical volume of a disk unit to perform a stand-alone operation, the first disk controller will be notified any time a second disk controller issues an unconditional reserve command for another logical volume of the same disk unit to reset the above-mentioned assign bit. This notification prevents the first disk controller from entering the "device-end-pending" state.

The present invention will be more clearly understood from the description below with reference to the accompanying drawings.

BRIEF DESCRIPTION OF THE DRAWINGS

FIG. 2, including 2A and 2B, is a partial circuit diagram of the string switching mechanisms of FIG. 1 according to the present invention.

DESCRIPTION OF THE PREFERRED EMBODIMENT

Figure 1:
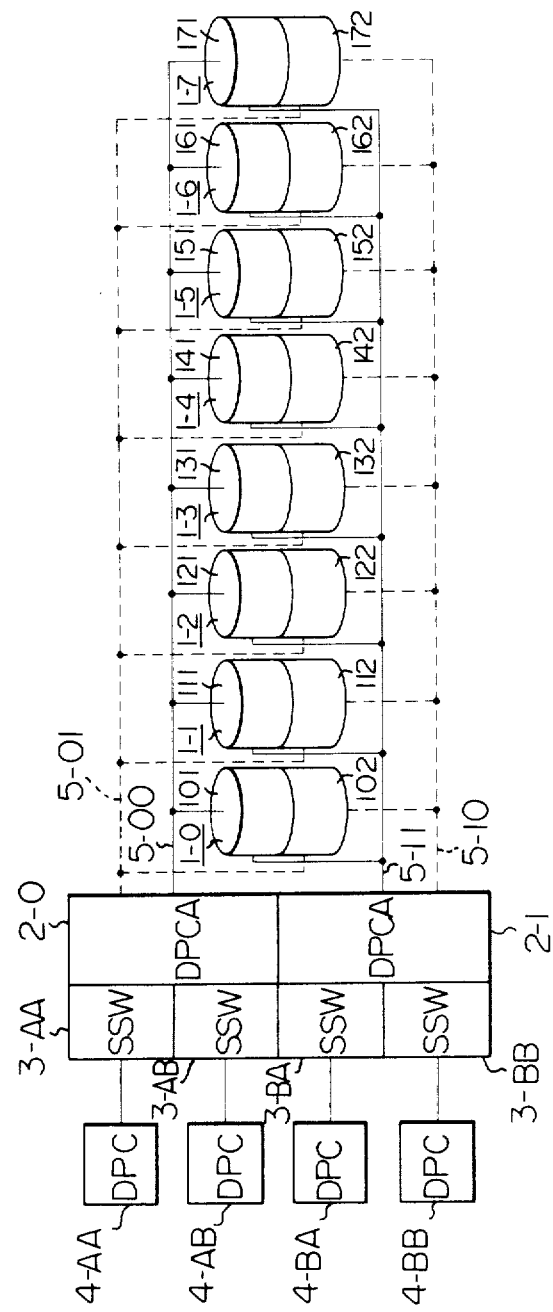
FIG. 1 is a a disk system to which the present invention is applied.

In FIG. 1, reference numerals 1-0 through 1-7 indicate disk units (or disk pack units) which are connected in series and which correspond to physical or real volumes. Each of the disk units 1-0 through 1-7 is divided into two logical volumes, that is, a primary logical volumes such as 101, 111, . . . , 171 and secondary logical volumes such as 102, 112, . . . , 172, to which individual machine numbers are assigned. Reference numerals 2-0 and 2-1 indicate disk control adapters; 3-AA, 3-AB, 3-BA, and 3-BB string switching mechanisms, provided for disk controllers 4-AA, 4-AB, 4-BA, and 4-BB, respectively; 5-00 a bus for accessing the primary logical volumes 101 through 171 by the adapter 2-0; 5-01 a bus for accessing the secondary logical volumes 102 through 172 by the adapter 2-0; 5-11 a bus for accessing the primary logical volumes 101 through 171 by the adapter 2-1; and 5-10 a bus for accessing the secondary logical volumes 102 through 172 by the adapter 2-1.

In FIG. 1, two of the disk units 1-0 through 1-7 are accessed simultaneously by the adapters 2-0 and 2-1 to enhance the throughput of the system.

The disk control adapters 2-0 and 2-1 comprise parallel-serial converters for converting parallel data from the disk controllers 4-AA through 4-BB into serial data, serial-parallel converters for converting serial data from the disk units 1-0 through 1-7 into parallel data, error check code (ECC) circuits, and so on.

Each of the string switching mechanisms 3-AA through 3-BB comprises registers for status information, such as 16 assign bit registers and 16 device end bit registers, for 16 logical volumes. The string switching mechanism 3-AA is connected by a device cross-call interface circuit (not shown) to the string switching mechanism 3-AB, so that the status information of one of the mechanisms 3-AA and 3-AB can be read out to the other. Similarly, the string switching mechanism 3-BA is connected by a device cross-call interface circuit (not shown) to the string switching mechanism 3-BB, so that the status information of one of the mechanisms 3-BA and 3-BB can be read out to the other. Further, a device cross-call interface circuit (not shown) is provided between the disk control adapters 2-0 and 2-1, so that the status information can be read from the string switching mechanisms 3-AA and 3-AB to the string switching mechanisms 3-BA and 3-BB, or vice versa.

In FIG. 1, when the disk controller 4-AA performs a seek-control operation or other scanning control operation upon the logical volume 101, the disk controller 4-AA sets an assign bit in the corresponding assign bit register of the string switching mechanism 3-AA to occupy the logical volume 101. As a result, the logical volume 101 performs a stand-alone operation. In this state, when another disk controller such as 4-AB seeks to access the logical volume 102, the disk unit 1-0 returns a "busy" signal to the disk controller 4-AB. Of course, when the logical volume 101 enters into a predetermined state, that is, when the logic volume 101 completes the seek-control operation by the stand-alone operation, the logical volume 101 issues an interruption signal to the disk controller 4-AA which, in turn, performs the next operation.

On the other hand, when any malfunction occurs in the logical volume 101 during a stand-alone operation it blocks all other control operation of the disk unit 1-0 by the other disk controllers. To avoid this, when another disk controller such as 4-AB seeks to access the logical volume 102 and receives "busy" signals from the disk unit 1-0, the disk controller 4-AB determines that a malfunction has occurred in the logical volume 102 and issues an unconditional reserve command for the logical volume 102, and as a result the assign bit indicating occupation of the logical volume 101 set by the disk controller 4-AA is reset. As a result, the logical volume 101 is released.

This, however, is found to give rise to the problem mentioned previously, i.e., in the above-mentioned state, the disk controller 4-AB judges that a malfunction has occurred in the logical volume 102 every time it seeks to access the logical volume 102 for a predetermined period and receives "busy" signals from the disk unit 1-0. The disk controller 4-AB thus issues an unconditional reserve command for the logical volume 102, and as a result, the assign bit for indication occupation of the logic volume 101 set by the disk controller 4-AA is reset even when no malfunction has actually occurred. Should the logical volume 101 actually be performing a stand-alone operation with no malfunction, the disk controller 4-AA would then end up in a standby state to await an interruption signal, showing the completion of the stand-alone-control through the string switching mechanism 3-AA from the logical volume 101, which would never be issued. As a result, the disk controller 4-AA would enter a "device-end-pending" state. If the logical volume 101 were a system volume which stores programs for an operating system, the system result would be a system down.

According to the present invention, however, the disk controller such as 4-AA which causes a logical volume to perform a stand-alone operation is notified of the inssuance of an unconditional reserve command by another disk controller such as 4-AB. As a result, the disk controller 4-AA can be prevented from entering a "device-end-pending" state. This is accomplished by the circuit illustrated in FIG. 2.

In FIG. 2, blocks 6-0 through 6-7 correspond to the disk units 1-0 through 1-7, respectively, decoders 7-AA through 7-BB associated with NOR circuits 8-AA through 8-BB correspond to the disk controllers 4-AA through 4-BB, respectively. A circuit 9 comprising a NOR circuit 91, a flip-flop 92, and a NOR circuit 93 is connected to all the disk units 6-0 through 6-7.

In the block 6-0, reference numeral 11 indicates an OR circuit; 12 and 13 AND circuits; 14 through 17 NAND circuits; 18 and 19 flip-flops; 20, 21, and 22 OR circuits; 23 and 24 AND circuits; 25 a NOR circuit; 26 a flip-flop; 27 and 28 AND circuits; 29 and 30 AND circuits; and 31 a NAND circuit. The flip-flop 18 serves as a means for storing whether or not the primary logic volume 101 is performing a stand-alone operation, while the flip-flop 19 serves as a means for storing whether or not the secondary logic volume 102 is performing a stand-alone operation. The AND circuits 27 and 28 serve as interruption signal generating means which are enabled by the flip-flop 26. Note that the elements 20 through 26 also serve as decoder means as well as the decoders 7-AA through 7-BB. Further, the circuit 9 serves as a means for notifying the disk controller, such as 4-AA, of the issuance of an unconditional reserve command.

When the disk controller 4-AA performs a scanning control operation such as a seek control, a rezero control, a set target control, or a pad control upon the primary logical volume 101, the disk controller 4-AA issues to the circuits 14 through 17, a #0 selection signal #0S for selecting the disk unit 1-0 and, in addition, issues to the circuits 12 and 15 a primary drive signal PDS for selecting the primary volume 101 of the disk unit 1-0. Further, the disk controller 4-AA generates a seek start signal SS, a rezero start signal RS, a set target start signal ST, or a pad start signal PS to the OR circuit 11. As a result, the flip-flop 18 is set by the circuits 11 12, and 14, and, accordingly, stores the fact that the logical volume 101 is performing a stand-alone operation for the disk controller 4-AA. In this state, when the logical volume 101 completes the stand-alone operation, the logical volume 101 issues an interruption signal (not shown) to the disk controller 4-AA which, in turn, generates an attention reset signal AT to the circuit 15. As a result, the flip-flop 18 is reset.

On the other hand, when the flip-flop 18 is being set, the other disk controller 4-AB may issue the above-mentioned unconditional reserve command. In this case, the unconditional reserve command indicated by URABS is issued for the secondary logical volume 102.

Note that in the representation "URABS", UR represents Unconditional Reserve signal, AB represents that this signal originates from the disk controller 4-AB, and S represents "Secondary".

Therefore, in the above-mentioned state, the decoder 7-AB issues an output signal to the OR circuit 22 of the block 6-0. In addition, since the output signal PATOP of the flip-flop 18 is logic "1", the output signal of the AND circuit 24 is also logic "1". As a result, the flip-flop 26 is set by the NOR circuit 25, so that the AND circuit 27 is turned on to issue an interruption request signal #0PI to the disk controller (in this case, 4-AA) which causes the logical volume 101 to perform a stand-alone operation.

In turn, when the disk controller 4-AA receives the interruption request signal #0PI, the disk controller 4-AA selects the disk unit 1-0 (which corresponds to the logic "1" of the #0 selection signal #0S), and selects the primary logical volume 101 (which corresponds to the logic "1" of the primary drive selection signal PDS). Accordingly, the disk controller 4-AA senses the state of the logical volume 101. As a result, the AND circuit 29 is turned on to generate an output signal EQCOP. Therefore, the flip-flop 92 is set by the NOR circuit 91, so as to issue an equipment check signal PSEQC to the disk controller 4-AA. In this case, the equipment check signal PSEQC is ORed with a conventional write data check signal and is transmitted to the disk controller 4-AA. Since the above-mentioned equipment check signal PSEQC is issued under the condition that no write command is issued, the disk controller 4-AA determines that the above-mentioned unconditional reserve command is being issued. After that, the disk controller 4-AA issues an attention reset signal AT to reset the flip-flop 18 and, in addition, issues a control reset signal CR to reset the flip-flop 26 and 92.

As explained hereinbefore, according to the present invention, in a no malfunction state, a first disk controller which causes one logical volume of a disk unit to perform a stand-alone operation is notified when a second disk controller issues an unconditional reserve command for another logical volume of the disk unit, thereby preventing the first disk controller from entering a "device-end-pending" state.

We claim:

1. A disk system, comprising:
   a plurality of disk units, each having at least one primary logical volume and one secondary logical volume to which individual machine numbers are assigned;
   a plurality of disk controllers;
   a plurality of string switching means, each operatively connected to one of said disk controllers, for communicating status information;
   two disk control adapters with a cross-call function, connected between said string switching means and said disk units;
   double access path means connected between said disk control adapters and said disk units, for connecting said disk units to said disk control adaptors, one of said disk controllers setting an assign bit so as to cause one logical volume of a disk unit to perform a stand-alone operation, the assign bit being reset when another of said disk controllers issues an unconditional reserve command for another logical volume of the disk unit;
   a plurality of means, operatively connected to said disk controllers, with one means provided for one logical volume, for storing whether or not a stand-alone operation is performed on the corresponding logic volume and for producing an output;
   decoder means, operatively connected to said disk controllers, for decoding the destination of said unconditional reserve command;
   a plurality of interruption signal generating means, each operatively connected to one of said storing means and to said decoder means, said interruption signal generating means for issuing an interruption request signal to the corresponding disk controller when said decoder means designates one of said storing means which represents said stand-alone operation; and
   notification means (9), operatively connected to one of said disk controllers, to said interruption signal generating means and to said decoder means, for issuing a notification signal for representing the issuance of said interruption request signal to the corresponding disk controller.

2. A system as set forth in claim 1, wherein said decoder means comprises:
   a plurality of decoders, each provided for one of said disk controllers, for decoding an address signal associated with said unconditional reserve command to indicate one of said disk units and for producing an output;
   a logic circuit, operatively connected to said decoders and to one pair of said means for storing, for issuing an output signal in response to the output of said decoders, the outputs of one pair of said means for storing and said unconditional reserve command; and
   a flip-flop, operatively connected to said logic circuit, to said notification means, and to said interruption signal generating means, for issuing an output signal to said interruption signal generating means, said flip-flop being set by said logic circuit.

3. A system as set forth in claim 2, wherein said notification means comprises:
   a first NOR gate operatively connected to said interruption signal generating means;
   a second NOR gate operatively connected to one of said disk controllers; and
   a flip flop operatively connected to said first NOR gate, said second NOR gate and to one of said disk controllers.

4. A disk system for at least two disks, comprising:
   first and second accessing means for accessing the two disks simultaneously;
   at least first and second disk units operatively connected to the respective disks and to both of said first and second accessing means; and
   notification means, operatively connected to said two first and second disk units and said first and second accessing means, for notifying said first accessing means that said first disk unit has been interrupted by said second accessing means and for notifying said second accessing means that said second disk unit has been interrupted by said first disk unit.

5. A disk system as set forth in claim 4, wherein said notification means comprises:
   a NOR gate operatively connected to said first and second disk units; and
   a flip flop operatively connected to said NOR gate and said first and said accessing means.

6. A disk system as set forth in claim 5, wherein the disks have primary and secondary logical volumes, and wherein each disk unit comprises:
   a logic circuit operatively connected to said accessing means;
   decoder means, operatively connected to said accessing means, for decoding whether said disk unit has been interrupted;
   stand-alone indication storing means, operatively connected to said logic circuit, for storing whether the disk connected to said disk unit has its primary or secondary logical volumes operating in a stand-alone mode; and
   interruption signal generating means, operatively connected to said NOR gate, said stand-alone indication storing means and said decoder means, for generating an interrupt request signal.

* * * * *

UNITED STATES PATENT AND TRADEMARK OFFICE
CERTIFICATE OF CORRECTION

PATENT NO. :   4,494,215
DATED      :   JANUARY 15, 1985
INVENTOR(S):   TAKASHI KOIKE ET AL.

It is certified that error appears in the above-identified patent and that said Letters Patent is hereby corrected as shown below:

Col. 3, line 60, "inssuance" should be --issuance--.

Col. 5, line 63, "(9)" should be deleted.

Signed and Sealed this

Twenty-third Day of July 1985

[SEAL]

Attest:

DONALD J. QUIGG

Attesting Officer    Acting Commissioner of Patents and Trademarks